May 7, 1929.  S. WHITE  1,711,764

DEEP WELL PUMP

Filed Sept. 17, 1928

INVENTOR
Starley White
by J. H. Weatherford
ATTORNEY

Patented May 7, 1929.

1,711,764

UNITED STATES PATENT OFFICE.

STARLEY WHITE, OF STUTTGART, ARKANSAS.

DEEP-WELL PUMP.

Application filed September 17, 1928. Serial No. 306,448.

This invention relates to improvements in deep well pump casings and particularly to the pump casing and the bearings for the shaft associated therewith.

The greatest difficulties involved in the operation of a driving shaft for a pump in a deep well, are keeping the bearings of the shaft in alignment, rigidly supporting them, lubricating them and tightening them where they are worn. This latter item requires replacement when the parts become worn.

The principal objects of my invention are:

(a) To provide in connection with an outer casing, an inner tubular structure or barrel within which the line shaft may rotate, which barrel will support shaft bearings and carry the lubricant to them, which barrel may be braced against the vibration of the shaft, and which may be adjusted to bring bearings into alignment and thereafter be secured to maintain such alignment; and (b) To provide means for tightening the bearings within such inner tube and/or for removing the same and replacing them.

This invention may be utilized in connection with pumps for oil, water or other liquids and while it is capable of use with various types of pumps, I have illustrated herein a form which is peculiarly adapted to the operation of a rotary type of pump through the intermediary of a vertical shaft. As is well known, the outer casing or discharge pipe, and the inner or protecting pipe or barrel, for the line shaft are made up in sections for use in wells of various depths, and in carrying out my invention, I rigidly connect or join the ends of the casing to the corresponding ends of the barrel so that the barrel ends are rigidly held concentric with the casing; and in addition I provide one or more intermediate supports which may be adjusted laterally to compensate for any curvature of the casing and irrespective of such curvature provide a straight barrel.

Various types of couplings may be employed for connecting the ends of adjacent sections of casing and the ends of the barrel sections, but such couplings are so well known that it is only deemed necessary to illustrate one of the common types thereof in each case.

By rigidly bracing the concentric barrel and casing ends and coupling together the barrel and casing ends of adjacent sections, the tubular casing structure is braced to withstand strains incident to placing the casing and pump in and removing them from well and incident to the vibration of the line shaft; whereby repairs and replacement of parts may be accomplished with facility and long and uninterrupted operation may result.

The manner in which the objects of my invention as set out, and other objects, are accomplished and the means of their accomplishment will readily be understood from the following specification on reference to the accompanying drawings in which.

Figure 1:
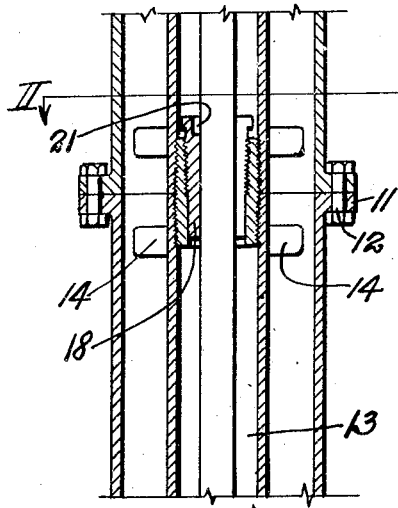
Fig. 1, is a sectional elevation taken on the center line showing typical section of a well casing with the adjacent sections secured thereto.
Figure 1:
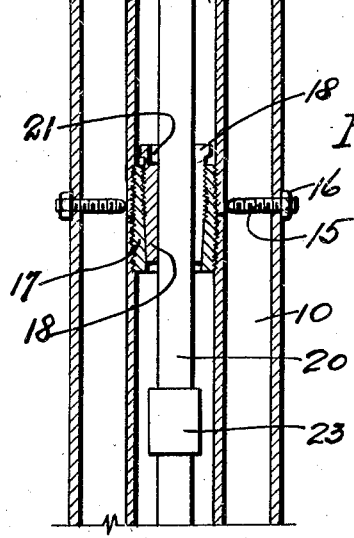
Figure 1:
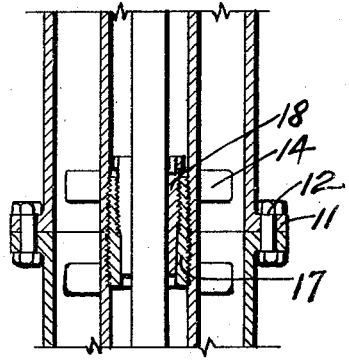
Figure 2:
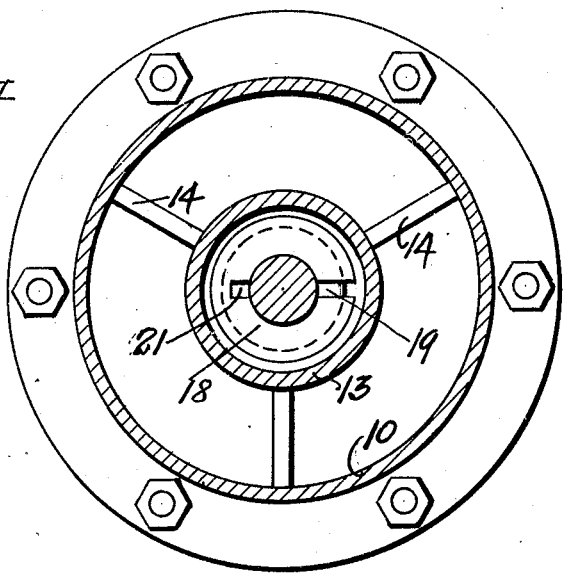
Fig. 2, is an enlarged sectional plan taken on the line II—II of Fig. 1.

Referring now to the drawings, 10 is the well casing having flanges 11, on the ends thereof, through which flanges bolts 12 may be passed to secure the section to adjacent sections on either side thereof. These sections are ordinarily made up of standard pipe lengths ranging usually from 16 to 20 feet but may be made longer or shorter as the length of pipe available may prescribe or the exigencies of the situation may demand. Secured within the casing 10, is the shaft barrel 13, which is of identical length with the casing section in which it is placed. Preferably this barrel for convenience of construction is made in two or more substantial equal sections two being used where one intermediate bearing is to be used and three where two bearings are to be used.

The ends of the barrel 13, are rigidly secured with reference to the corresponding casing ends, by spider legs 14, which are preferably welded to both the barrel and the casing and which legs accurately center the barrel with reference to the casing. At the middle point of the casing and barrel, where one intermediate bearing is used, studs 15, are inserted through the casing 10, which has been tapped for their insertion and are firmly seated against the inner barrel. These studs are adjusted until the inner barrel is straight and true and thereafter jam nuts 16, may be screwed on the studs and against the wall of the casing. Preferably these nuts are then electrically welded to the casing and to the studs so that, the alignment of the inner barrel having been once effected, there is no possibility of its being thereafter disturbed.

Figure 3:
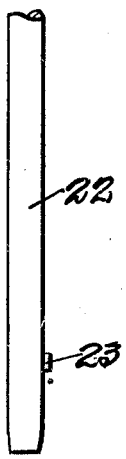
Fig. 3, is an elevation showing the lower end of and a portion of the stem of a tool which may be used in tightening, loosening or otherwise adjusting any or all of the individual bearings within the casing.

The various sections of the barrel are connected together by close nipples 17, each of these nipples being exteriorly threaded and the ends of the barrel sections being correspondingly interiorly threaded. Approximately half of the interior of these nipples is also threaded the other half being bored out with a slight taper. Within these nipples are the shaft bearings 18. These bearings are exteriorly tapered to fit the interior taper of the nipple, and have their upper portions threaded to engage the threaded interior portion of the nipple. Preferably they are entirely cut in two on one side by a slot 19 whereby when they are screwed down in the nipple 17 they will adjust themselves to conform to the shaft 20, and as wear occurs they may be tightened to take it up. A notch 21, is formed in each of these bearings to receive a wrench lug whereby this adjustment may be effected. Preferably the notch 21, is of approximately the same width as the slot 19, in order that the lug of the wrench used may be passed through this slot to reach an underlying bearing should the same be desired. In Fig. 3, I have shown the lower end of the wrench used for this purpose. This wrench is a rod 22, of approximately the same size though possibly slightly smaller than the shaft 20, which rod is provided with a lug 23, slightly thinner than the slot 18.

The various sections of pump shaft are connected together by couplings 23, these couplings preferably being of less exterior diameter than the interior diameter of the nipples 17, so that it may be possible to remove sections of the pump shaft by removing the bearings 18 from the nipples.

Units are usually made up in 20 foot lengths. Flanges 11, are welded to the ends of the casing 10, the casing is placed in a lathe and these flanges trued up and faced. The barrel, of either two or three sections, is assembled by securing the ends of these with the nipples 17. If the barrel is made up of three sections it is necessary that the interior threads of these nipples be turned toward the ends of the assembled barrel in order to permit the later insertion of the shaft bearings. This assembled barrel is then trued up and threaded interiorly at each end in a lathe and is faced to exactly the same length as the outer casing. The barrel is then placed within the casing and centered at each end and when so centered is permanently secured by welding the spider legs 14, to the casing and barrel. The interior joints in the barrel are next aligned by insertion and adjustment of the studs 15, until the interior of the barrel is straight and true and these studs are welded to the casing as before described. The interior shaft bearings are then placed in the interior sleeves and are screwed to place and adjusted by the wrench 22. An additional sleeve is then screwed into one end of the barrel and a shaft bearing screwed into and tightened in this sleeve. Thereafter a section of line shaft of corresponding length is passed through the bearings, this shaft having a coupling on one end to permit its engagement with a similar section of shafting and the complete unit comprising casing, barrel, bearings and line shaft is ready for shipment.

In the field two of these units are brought together with the barrel end having no inserted nipple, engaging the nipple in place in the end of the other barrel, and the two sections are screwed together until the casing flanges meet and bolt holes in the flanges thereof are in alignment, after which they may be securely bolted together. The aligned shafts are now pushed together and the upper shaft screwed down on the lower until the shaft coupling is tight and thereafter additional sections are added as may be desired.

Having described my invention, what I claim is:

1. A well-tubing unit, comprising a section of casing having both ends flanged, a barrel within said casing, of identical length with said casing, lugs integral with said casing and barrel at the opposite ends thereof, securing the ends of said barrel concentric with the ends of said casing, studs intermediate the ends of said casing adjustable to align said barrel within said casing, bearings at each end of said section and intermediate thereof, held in alignment by said barrel and a section of shafting mounted in said bearings.

2. A sectional tubing for wells, comprising a plurality of units, means for coupling the units together, each unit comprising an inner barrel and outer casing, the barrel and casing having permanent stay lugs near the ends centralizing said barrel in said casings and outside adjustable stay bolt lugs centrally located along each section; removable shaft bearings in said barrel and a line shaft through said bearings, said line shaft adapted to be removed; said bearings being slotted at the end to receive a wrench lug which by turning said wrench will unscrew said bearing for repairing.

3. The combination with a line shaft bearing barrel comprising a plurality of sections having interiorly threaded ends, of removable line shaft bearings, each slotted at one end, said bearings having one portion of the exterior threaded and the remainder thereof tapered, said slotted ends adapted to rereceive a tool consisting of a bar having a lug near one end which bar by turning will remove, replace or tighten said bearings, nipples connecting the inside threaded ends of said barrel sections, said nipples being interiorly threaded and tapered to correspond to said bearings, a discharge casing enclosing said barrel, lugs secured between said casing and barrel and centralizing said barrel in said casing, and adjustable means for aligning intermediate portions of said barrel relative to said casing.

In testimony whereof I hereunto affix my signature.

STARLEY WHITE.